Jan. 1, 1935.    M. A. EDWARDS    1,985,982
CONTROL SYSTEM
Filed March 21, 1934    4 Sheets-Sheet 1

Fig.1.

Inventor:
Martin A Edwards,
by Henry E. Dunham
His Attorney

Fig 4.

Patented Jan. 1, 1935

1,985,982

UNITED STATES PATENT OFFICE 1,985,982

CONTROL SYSTEM

Martin A. Edwards, Schenectady, N. Y., assignor to General Electric Company, a corporation of New York Application March 21, 1934, Serial No. 716,618

12 Claims. (Cl. 172—239)

This invention relates to control systems, more particularly to follow-up control systems for driving an object into positional agreement with a control device, and it has for an object the provision of a simple, reliable and improved system of this character.

The present application is a continuation in part of earlier filed application, Serial No. 646,670, filed December 10, 1932, and assigned to the same assignee.

More specifically the invention relates to follow-up systems in which electric valve apparatus is employed to control the supply of current to the driving motor and in which fine and coarse controlling means are employed for controlling the valve apparatus, and a specific object of the invention is the provision of improved means for shifting the control from the fine controlling means to the coarse controlling means when the positional disagreement of the control device and driven object exceed a predetermined amount.

In carrying the invention into effect in one form thereof, high speed rotary induction apparatus supplies the controlling voltage to the grid of the electric valve apparatus to provide fine control of the system when the positional disagreement of the pilot device and driven object is small, and additional rotary induction apparatus operating at low speed provides the coarse control, and means are provided for shifting the grid control from the high speed to the low speed rotary induction apparatus when the positional disagreement of the pilot device and the driven object exceeds a predetermined amount.

In illustrating the invention in one form thereof, it is shown as applied in a gun directing system, but it will of course be understood that the invention has other applications.

For a better and more complete understanding of my invention reference should now be had to the following specification and to the accompanying drawings in which.

Figure 1:
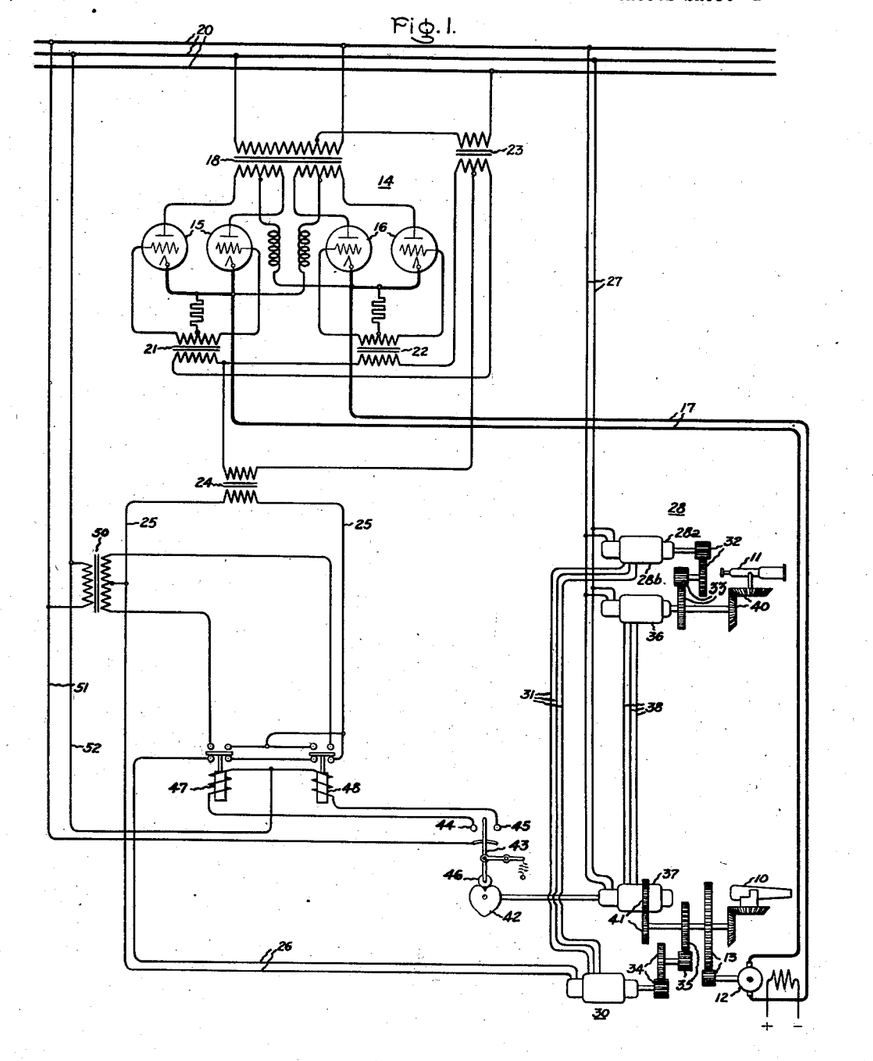
Fig. 1 is a simple diagrammatical representation of an embodiment of the invention.

Referring now to the drawings, an object such for example as that represented by the gun 10 is driven into positional agreement with a pilot or control device represented as a telescope 11 by suitable driving means such for example as represented by the direct current electric motor 12, to the drive shaft of which the gun mounting platform is connected by means of suitable reduction gearing 13. Direct current is supplied to the armature of the motor 12 by means of electric valve apparatus 14 illustrated as comprising a pair of valves 15 for supplying current in one direction to the armature of the motor and a second pair of valves 16 for supplying current to the motor armature in the opposite direction, to which the valve apparatus is connected by means of conductors 17.

The electric valve apparatus 14 is in turn supplied through a transformer 18 from a suitable source of alternating voltage represented in the drawings by the three supply lines 20 through the upper and middle lines of which the terminals of the primary winding of the transformer are connected as illustrated and to the terminals of the respective secondary windings of which the anodes of the pairs of valves 15 and 16 are connected as illustrated. Although the electric valves may be of any suitable type, they are preferably of the three electrode type into the envelope of which a small quantity of an inert gas such for example as mercury vapor is introduced after exhaust, the presence of which mercury vapor serves to convert the usual electron discharge into an arc stream thereby constituting the valves electrostatically or grid-controlled arc rectifiers. Each pair of valves is connected for full wave rectification, that is to say, the anodes of each pair of valves are connected to opposite terminals of the associated secondary winding of the supply transformer whilst the cathodes of each pair of valves is connected to one of the supply conductors 17 and the mid-point of the associated supply transformer secondary winding is connected to the other conductor 17. Alternating voltage is supplied to the grids of the valve apparatus by means of grid supply transformers 21 and 22, the primary windings of which are connected in series relationship with each other and with the secondary winding of the grid bias transformer 23, whilst the opposite terminals of the secondary windings of each of the grid transformers are respectively connected to the grids of the associated pair of electric valves. One terminal of the primary winding of the grid bias transformer 23 is connected to the lower supply line 20 and the opposite terminal is connected to intermediate points of the primary windings of the supply transformer 18 thereby giving the grid voltage of the electric valve apparatus an initial phase bias with respect to the anode voltage. This initial phase bias may be any desired amount but is preferably substantially 90° lagging.

The average value of the current flowing in the output circuit of electric valve apparatus of the above-described type is varied as desired by varying the phase relationship between the grid and anode voltages. For example, when the grid and anode voltages are substantially in phase with each other, a current flowing in the output circuit is maximum and when the grid and anode voltages are substantially 180° out of phase with each other the current is minimum or zero whilst for intermediate phase relationship the current has corresponding intermediate values. In order to vary the phase relationship between the grid and anode voltages a component voltage of variable magnitude is supplied to the grid circuit substantially in phase with the anode voltage by means of a transformer 24, the opposite terminals of the secondary winding of which are respectively connected to a point between the primary winding of the grid transformers 21 and 22 and a midpoint of the secondary winding of the grid bias transformer 23 and the opposite terminals of the primary winding of which transformer are connected to the upper and middle supply lines 20 by means of conductors 25, 26 and 27 together with rotary induction apparatus illustrated as comprising a rotary induction device 28 referred to as the transmitter and a similary rotary induction device 30 referred to as the receiver connected in circuit as illustrated. The rotary induction device 28 comprises a rotor member 28$_a$ provided with a single phase winding (not shown) and a stator 28$_b$ provided with a distributed three-element winding (not shown) that is physically similar to the polyphase winding of the usual polyphase dynamo-electric machine. The stator and rotor windings are arranged in inductive relationship with each other so that the alternating magnetic field due to the current flowing in the primary winding induces voltages in the elements of the secondary winding. The receiver 30 is in all respects identical with the transmitter 28 and the terminals of its stator windings are connected to the terminals of the stator winding of the transmitter by means of conductors 31 so that the voltages induced in the stator winding of the transmitter causes a current to flow in the stator winding of the receiver producing a magnetic field similar to the magnetic field produced by the current flowing in the rotor winding of the transmitter. Rotation of the rotor winding of the transmitter causes a voltage to be induced in the rotor winding of the receiver, due to the rotation of the magnetic field of the receiver and the magnitude of the voltage induced in the rotor winding of the receiver depends upon the relationship of the axis of this winding to the axis of the magnetic field, e. g. when the axes of the magnetic field and of the rotor winding are parallel the induced voltage is maximum whilst when these axes are at right angles with each other the induced voltage is zero. It will, therefore, be clear that rotation of the rotor of the transmitter or of the receiver will vary the magnitude of the component voltage supplied to the grid circuit of the electric valve apparatus which in turn will result in a variation in the phase relationship of the resultant of the component and grid bias voltages, in other words, a variation in the phase relationship between the grid and anode voltages of the electric valve apparatus and a corresponding variation in the current supplied to the armature of the driving motor 12. The grid connections to the electric valve apparatus are so made that when the phase of the grid voltage of one pair of valves is advanced the phase of the grid voltage of the other pair of valves is retarded and consequently only one pair of valves is active at any instant.

The rotor of the transmitter is connected to the turn table upon which the telescope 11 is mounted by means of gearing 32 and 33. For the purpose of increasing the accuracy and sensitivity of the control, the ratio of the gearing between the telescope and the rotor of the transmitter can be made as large as is desired, for example, the ratio may be as much as 72:1 i. e., for each degree that the telescope is rotated the rotor of the transmitter is rotated 72°. The rotor of the receiver 30 is connected to the gun platform by means of gearing 34 and 35 having the same ratio as the gearing 32 and 33.

This large gear ratio provides a very fine and a very accurate control. If the ratio is 72:1 as assumed, then for each 5° of rotation of the telescope the rotor of the transmitter 28 is rotated a full 360°. However, since the axes of the rotor winding of the receiver 30 and the magnetic field of the stator are parallel for each 180° of revolution of the rotor of the transmitter, it will be clear that the telescope and the gun must not be allowed to become more than 2½° out of correspondence with each other because when this amount of positional disagreement occurs the same relationship exists between the rotors of the transmitter and receiver as exists when the telescope and gun are in correspondence with each other. In practice, under actual operating conditions, the telescope often does become more than this predetermined amount out of correspondence with the gun and a coarser system is therefore provided for taking over the control of a high speed system before this maximum permissible amount of positional disagreement exists. This coarse system is illustrated as comprising a transmitter 36 that is identical with the transmitter 28 and a receiver 37 that is similar to the receiver 30 with the exception that the stator of the receiver 37 is rotatably mounted in ball bearings. The single phase rotor windings of both the transmitter 36 and receiver 37 are connected to the upper and middle supply lines 20 and their stator windings are connected to each other by means of the conductors 38. The rotor of the transmitter is directly connected to the turntable upon which the telescope is mounted by means of the bevel gearing 40 having a 1:1 ratio whilst the rotor member of the receiver 37 instead of being connected to the gun platform is free to rotate whereas the ball bearing mounted stator of the receiver is geared to gun platform by means of gearing 41 having the same ratio as the gearing between the transmitter and the telescope turntable. Thus it will be seen that the transmitter 36 and receiver 37 constitute a low speed system and provide the desired coarse control.

The shaft of the rotor member of the receiver 37 is provided with a heart-shaped cam 42 which when the system is in correspondence occupies the central or neutral position in which it is illustrated. The movable contact arm of a suitable switching device 43 is biased to a central position between cooperating stationary contacts 44 and 45 by means of a spring and the contact arm 43 is further provided with a cam roller 46 engaging the cam 42 by means of which the contact arm 43 is moved into engagement with one or the other of the stationary contacts 44, 45 in response to rotation of the cam 42 in one direction or the other as the case may be.

The switching apparatus illustrated as comprising a pair of electromagnetic switching devices 47 and 48 respectively are under the control of the switching device 43 and are selectively energized and operated in response to actuation of the movable contact arm 43 into engagement with one or the other of the stationary contacts 44, 45.

For the purpose of supplying an alternating voltage to the grid circuit of the electric valve apparatus when the telescope and gun are more than the permissible amount out of correspondence and the fine control system is inactive a transformer 50 is provided having its primary winding connected to the middle and upper supply lines 20 and the mid-point of its secondary winding connected to the left-hand terminal of the primary winding of the grid supply transformer 24 and one or the other of the opposite terminals of the secondary winding of the transformer 50 is connected to the right-hand terminal of the primary winding of the grid supply transformer 24 depending upon which of the electromagnetic switching devices 47, 48 is energized and operated to its upper closed position.

With the above understanding of the apparatus and its organization in the completed system the operation of the system itself will readily be understood from the following detailed description.

Assuming the telescope 11 and gun 10 to be in positional agreement the system is in its normal deenergized condition in which it is illustrated. The manual rotation of the telescope 11 effects a corresponding but multiplied rotation of the rotor of the transmitter 28 causing a rotation of the magnetic field of the stator of receiver 30 so that a voltage is induced in the rotor winding of the receiver proportional to the amount of rotation of the telescope 11. This induced voltage is applied to the grid circuit of the electric valve apparatus advancing the phase relationship of the grid voltage of one pair of valves with respect to the anode voltage and retarding the voltage of the other pair of valves. Assuming that the direction of rotation of the telescope is such as to advance the phase of the grid voltage of the pair of valves 15 current is supplied by this pair of valves to the armature of the driving motor 12 in such a direction that the gun 10 is caused to follow the movement of the telescope. The rotation of the telescope 11 also produces a corresponding rotation of the rotor of the transmitter 36 and due to a self-synchronizing property of rotary induction apparatus of this character, the rotor member of the receiver 37 tends to rotate in synchronism with the rotor of the transmitter. The rotation of the stator member of the receiver 37 by the motor 12 is opposite to the direction of rotation of the rotor member and consequently if the gun remains in synchronism with the telescope 11, the rotor member of the receiver 37 remains at rest in space with the result that the cam member 42 also remains at rest in the position illustrated.

However, if the gun 10 cannot follow the rapid movement of the telescope and the telescope and gun become more than the maximum permissible amount out of correspondence the heart cam member 42 is rotated an amount sufficient to actuate the movable contact member 43 into engagement with one or the other of the stationary contacts 44, 45 depending upon the direction of the departure from correspondence. Assuming that the direction of departure from correspondence is such as to actuate the movable contact member 43 into engagement with the stationary contact member 44 an energizing circuit is completed for the operating coil of the electromagnetic switching device 47 that is readily traced from the upper supply line 20, through conductor 51, contacts 43 and 44, operating coil of switching device 47 and thence by conductor 52 to the middle supply line 20. The switching device 47 in responding to the energization of its operating coil operates to the upper closed position thereby interrupting the connections 26 from the high speed fine control receiver 30 to the grid supply transformer 24 and connecting the lower terminal of the secondary windings of transformer 50 to the right-hand terminal of the primary windings of the grid supply transformer 24. The interruption of the connections between the receiver 30 and the grid circuit of course renders the high speed fine control system inactive and the connection of the transformer 50 to the grid circuit causes the voltage to be applied to the grid circuit such that the current supplied by the valve apparatus to the armature of the motor 12 causes the motor 12 to drive the gun 10 at maximum speed in the same direction as that in which the telescope 11 is moving.

Had the departure from correspondence been in the opposite direction, the cam member 42 would have rotated the contact arm 43 into engagement with the stationary contact 45 and the electromagnetic switching device 48 would have been actuated to its upper closed position to take the control away from the high speed fine control system and to connect the upper terminals of the secondary winding of the transformer 50 to the grid circuit thereby reversing the polarity of the voltages applied to the grid circuit and energizing the other pair of valves by means of which current would be supplied to the motor 12 in the reverse direction and the gun driven toward correspondence with the telescope 11 and in the direction of movement thereof.

Assuming now that the telescope is trained on the target and comes to rest, the gun 10 is approaching correspondence with the telescope at maximum speed and when it arrives within the predetermined maximum permissible amount of positional disagreement with the telescope the cam 42 is again in the central position in which it is illustrated and the contact arm 43 is moved out of engagement with the stationary contacts 44 thereby deenergizing the electromagnetic switching device 47 which in responding to the deenergization of its operating coil descends to the lower position disconnecting the secondary of the transformer 50 and reestablishing the connections from the receiver 30 to the grid circuit, thereby transferring the control back from the low speed coarse system to the high speed fine system. Finally as the gun approaches exact and accurate correspondence of the telescope 11 the axis of the rotor of the receiver 30 approaches a right-angle relationship with the axis of the magnetic field of the stator and as a result the voltage induced in the rotor winding becomes zero and the pair of electric valves 15 become deenergized and cease to supply current to the driving motor 12 so that the gun 10 is finally brought to rest in correspondence to the telescope 11.

Figure 2:
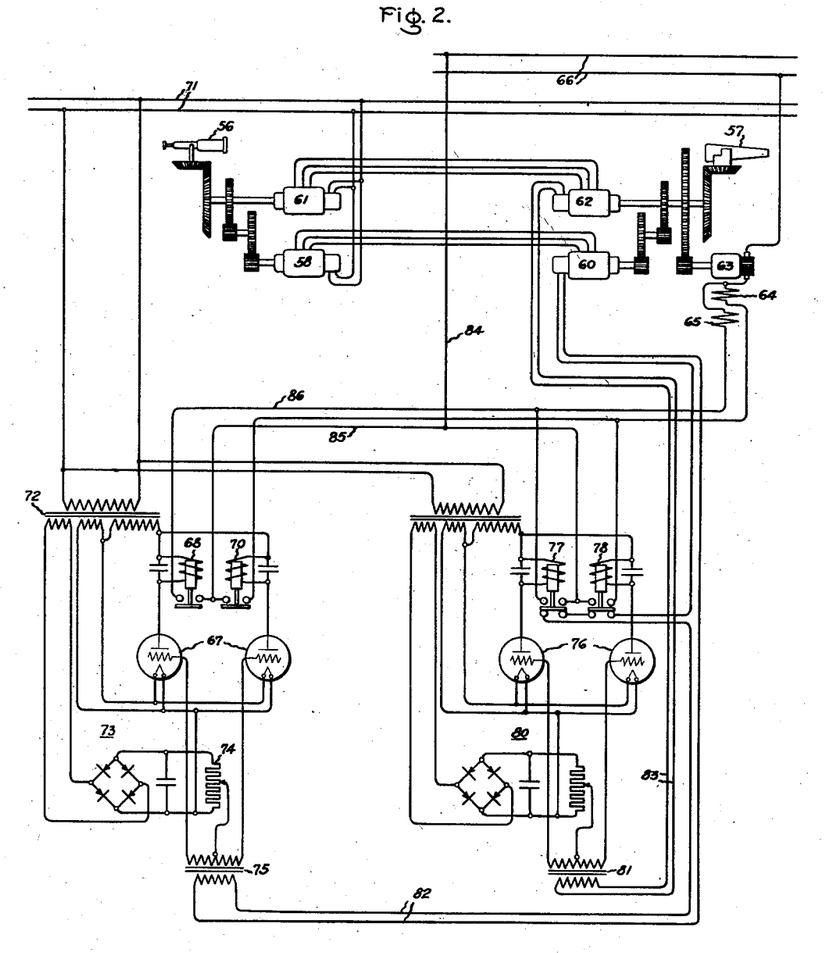
Figs. 2, 3 and 4 are simple diagrammatical representations of modifications.

In the modification of Fig. 2 the telescope 56, gun 57, high speed rotary induction apparatus 58, 60 and low speed rotary induction apparatus 61, 62 are all similar to the corresponding elements of the system of Fig. 1 with the exception that the receiver 62 of the low speed system has a fixed stator instead of a rotatable stator as in Fig. 1. The gun driving motor 63 is illustrated as a series type motor provided with split series field windings 64 and 65 supplied from a suitable source 66. A pair of valves 67 connected to the terminals of the rotor winding of the receiver 60 are under the control of the high speed system so as to energize one or the other of electromagnetic switching devices 68, 70 so as to energize one or the other of the split field windings 64, 65 and effect rotation of the motor 63 in one direction or the other, depending upon which of the electric valves 67 is energized. Although the valves 67 may be of any suitable type they are preferably of the high vacuum pure electron discharge type. Alternating voltage is supplied to the anodes of these valves from a suitable source 71 through a supply transformer 72 to the right-hand terminal of the secondary winding of which the anodes of both valves are connected as illustrated with the operating windings of the electromagnetic switching devices 68, 70 respectively in circuit therewith. Current to heat the cathodes of these valves is supplied by the middle portion of the secondary winding of the transformer 72 whilst a suitable negative direct current bias is applied to the grids of the valves through the left-hand portion of the secondary winding of transformer 72, copper oxide rectifying bridge 73 and potentiometer 74. As illustrated the grids of the valves 67 are respectively connected to opposite terminals of the secondary winding of the grid transformer 75 the mid-point of which is connected by means of a movable contact engaging the potentiometer 74 to provide adjustment of the grid bias as desired. Preferably the grid bias is adjusted to cut off, i. e. both halves are deenergized and both electromagnetic switching devices 68, 70 are likewise deenergized and occupy the lower open positions in which they are illustrated. Similar electric valve apparatus 76 is under the control of the low speed coarse system 61, 62 and electromagnetic switching devices 77, 78, the operating windings of which are respectively connected in the plate or anode circuits of the valves 76 and effect connection of the armature of the motor 63 through one or the other of the split field windings 64, 65, to the source 66 and provide rotation of the motor 63 in one direction or the other. Grid biasing means 80 similar in all respects to the grid biasing means described in connection with the electric valves 67 are provided for biasing the grids of electric valves 76 to cut off so that both valves are normally deenergized. The primary winding of the grid transformer 75 is connected by means of conductors 82 to the rotor winding of the receiver 60 so that valves 67 are under the control of the fine high speed system and similarly the terminals of the primary windings of the grid transformer 81 are connected by means of the conductors 83 to the rotor winding of the receiver 62 so that the valves 76 are under the control of the low speed coarse system.

In operation, the rotation of the telescope 56 effects a greatly multiplied rotation of the rotor of the transmitter 58 and causes a voltage to be induced in the rotor winding of the receiver 60 and applied through the transformer 75 to the grid of the electric valves 67. The instantaneous polarity of this voltage of the terminals of the secondary winding of transformer 75 depends of course upon the direction of rotation of the rotor member of the transmitter 58. Assuming that at any instant that the anode voltages of the valves 67 are positive the polarity of the voltage of the left-hand terminal of the secondary winding of transformer 75 is also positive, the negative grid bias of the left-hand valve 67 is overcome whilst the negative grid bias of the right-hand valve is still further increased. This results in energization of the left-hand valve causing current to flow in the anode circuit through the operating coil of the electromagnetic switching device 68, the movable contact member of which is operated to the upper closed position in response to the energization of the operating coil to complete a circuit for the armature of the motor 63 through the field winding 65 that is readily traced from the upper supply line 66, through conductors 84 and 85, contacts of switching device 68 in the upper closed position thereof, thence by conductors 86 to and through the split series field winding 65 and armature of motor 63 to the lower supply line 66 thereby effecting rotation of the motor 63 in such a direction as to drive the gun 57 into positional agreement with the telescope 56. If the telescope 56 becomes more than the permissible maximum amount out of correspondence with the gun 57 the voltage induced in the rotor winding of the receiver 62 becomes sufficient to overcome the negative grid bias of one of the valves 76 (depending upon the direction of departure from correspondence) thereby energizing one of the valves. Assuming that the direction of departure from correspondence is the same as that which effects the energization of the left-hand valve 67, the left-hand valve 76 will be energized and current caused to flow in the anode circuit of the valves through the operating winding of the electromagnetic switching device 77 and as a result of the energization of this operating coil the movable contact of the switch is moved to its upper position in which it interrupts the connections 82 thereby deenergizing the valve apparatus 67 and the entire high speed fine control system and simultaneously bridging the upper stationary contacts to maintain the motor circuit previously traced and as a result the gun 57 continues to be driven at high speed under the control of the coarse low speed control system. As the telescope is trained on the target and finally comes to rest and the gun 57 arrives within the maximum permissible amount of permissible disagreement with the telescope, the voltage induced in the rotor winding of the receiver 62 is sufficiently decreased to render the negative grid bias of the valve 76 effective again thereby deenergizing the electron valves and the operating coil of the switching device 77. The latter in response to the deenergization of its operating coil allows its movable contacts to descend from its upper to its lower position in which it restores the connections from the receiver 60 to the primary winding of the transformer 75, thus retransferring the control to the low speed fine control system.

As the gun 57 approaches correspondence with the telescope the voltage induced in the rotor winding of the receiver 60 decreases rapidly and finally becomes less than the magnitude of the grid bias of the left-hand valve 67 as a result of which the valve becomes inactive and the operating coil of the switching device 68 is deenergized allowing the movable contact to descend out of engagement with its cooperating stationary contacts so as to interrupt the connection from the motor 63 to the supply source. The motor finally is brought to rest with the gun in correspondence with the telescope.

It will be clear that if the telescope had been rotated in the opposite direction from that assumed in the above discussion that while the high speed fine control system was active the right-hand valve 67 would have been energized, the switching device 70 operated to its upper position and the motor 63 caused to rotate in the opposite direction and the gun 57 driven in the direction of the movement of the telescope. Similarly, while under the control of the low speed coarse system the right-hand valve 76 would have been energized, the switching device 78 operated to its upper position to transfer the control from the high speed to the low speed system and the motor 63 caused to operate under the control of the switching device 78 until the gun 57 arrives within the maximum permissible amount of positional disagreement.

Figure 3:
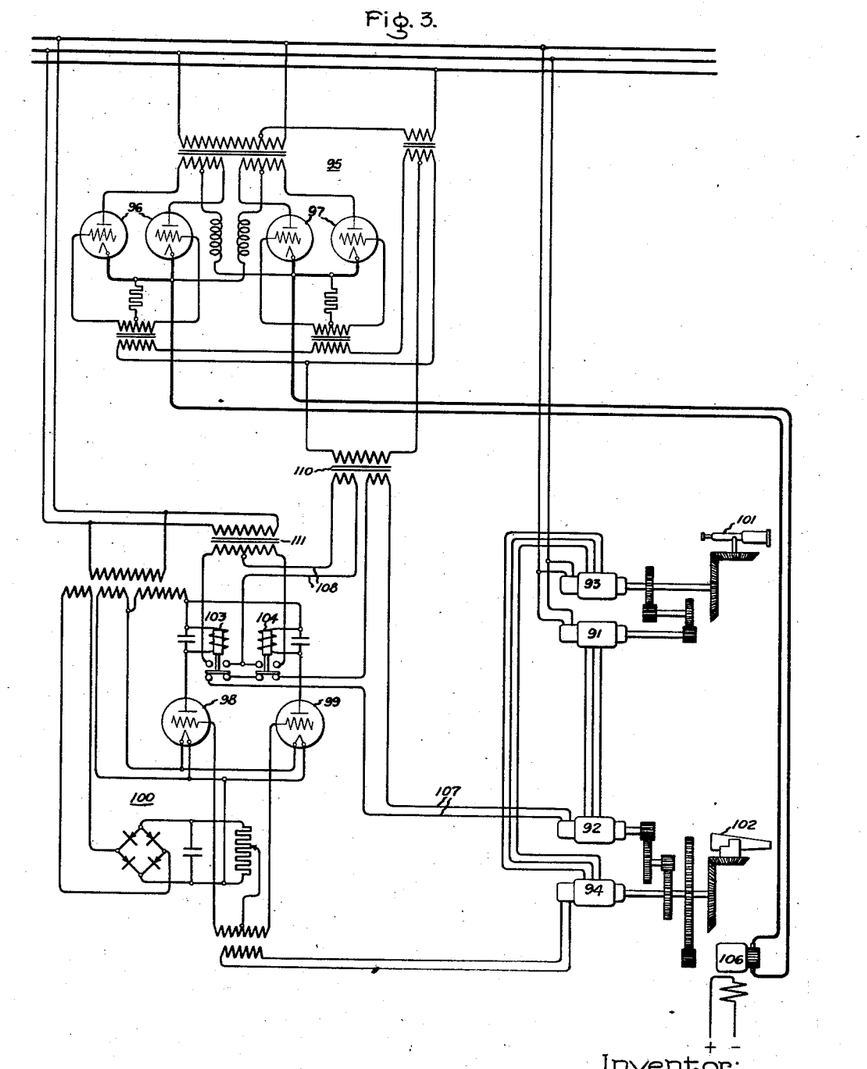

In the modified system of Fig. 3, the switching device and the driven object are the same as illustrated in the previous figure. The high speed rotary induction apparatus 91, 92 and the low speed rotary induction control apparatus 93, 94 are identical with the apparatus 58, 60, 61, and 62 of Fig. 2 and for this reason require no further description. Similarly the electric valve apparatus 95 of Fig. 3 is identical with the valve apparatus 14 of Fig. 1 and the anode, grid, and cathode supply connections for the pairs of valves 96 and 97 are identical with those of the pairs of valves 15, 16 of Fig. 1. The electric valves 98, 99 are of the high vacuum type as are the valves 67 of Fig. 2 and are connected in the same manner; the grids being biased to cut off by negative grid bias means 100 similar in all respects to the grid biasing means 73 of Fig. 2.

With the telescope 101 and the gun 102 in correspondence both sets of electric valve apparatus 96, 97 and 98, 99 are deenergized and the electromagnetic switching devices 103, 104 respectively under the control of valves 98, 99 are likewise deenergized and the movable contacts occupy the lower positions in which they are illustrated. A movement of the telescope effects a rotation of the rotor of the high speed transmitter 91 resulting in a voltage being induced in the rotor winding of the receiver 92 and applied to the grid circuit of the electric valve apparatus 95 so that the phase of the grid voltage of one of the pairs of valves is advanced and that of the other pair retarded. Assuming that the direction of rotation of the telescope is such as to advance the grid phase of the pair of valves 96, current is supplied to the gun driving motor 106 in a direction such that the gun 102 is driven in a direction corresponding to the direction of movement of the telescope.

If the telescope 101 becomes more than the maximum permissible amount out of correspondence with the gun the voltage induced in the rotor windings of the receiver 94 becomes sufficiently great to overcome the negative grid bias of one of the valves 98, 99, which for the purpose of illustration is assumed to be the valve 98. Simultaneously, the negative grid bias of the valve 99 is increased. The removal of the negative bias from the grid of the valve 98 causes this valve to become conducting and to energize the operating winding of the switching device 103, the movable contact of which is attracted to its upper position in response to the energization of its operating coil thereby interrupting the connections 107 from the high speed receiver 92 and the grid circuit of the electric valve apparatus 95, thus rendering the high speed fine control apparatus ineffective and at the same time the movable contact of the switching device 103 completes the connections 108 from the left-hand primary winding of the grid transformer 110 to the left-hand of the secondary winding of the supply transformer 111. The polarity of the voltage thus applied to the grid circuit of electric valve apparatus 95 is such that the pair of valves 96 is maintained energized and the effective value of this voltage is substantially constant and of such magnitude that the gun driving motor 106 is caused to operate at maximum speed under the control of the low speed coarse control system.

As the telescope 101 comes to rest trained on the target and the gun 102 arrives within the maximum permissible positional disagreement with the pedestal, the voltage induced in the rotor winding of the receiver 94 decreases sufficiently to render the negative grid bias applied to the valve 98 effective and to render the valves non-conductive. As a result of this the switching device 103 is deenergized and its movable contact descends to the lower position in which it is illustrated thereby interrupting the connections 108 and taking the control away from the low speed coarse system and simultaneously reestablishing the connections 107 and retransferring the control to the high speed fine controlling system. Finally, as the gun 102 approaches exact and accurate correspondence with the telescope the voltage induced in the rotor of the receiver 92 becomes greatly reduced and the phase of the grid voltage of the pair of valves 96 retarded thereby decreasing the current supplied to the motor 106 to zero so that the gun is finally brought to rest in correspondence with the telescope.

It will be clear that had the telescope 101 been rotated in the opposite direction the pair of valves 97 would have been energized under the control of the high speed fine system and the motor 106 caused to drive the gun 102 in the direction of movement of the telescope. Likewise if the positional disagreement of the gun and telescope under this condition had exceeded the maximum permissible amount the valve 99 would have been energized and the switching device 104 operated to its upper position to interrupt the connections 107 and transfer the control from the high speed fine system to the low speed coarse system with the right half of the secondary winding of the transformer 111 connected to the primary winding of the grid transformer 110 to provide the correct polarity to continue this direction of rotation. And similarly when the gun arrives in proximity to correspondence with the telescope the valve 99 and switching device 104 would have become deenergized and the control retransferred to the high speed fine control system.

Figure 4:
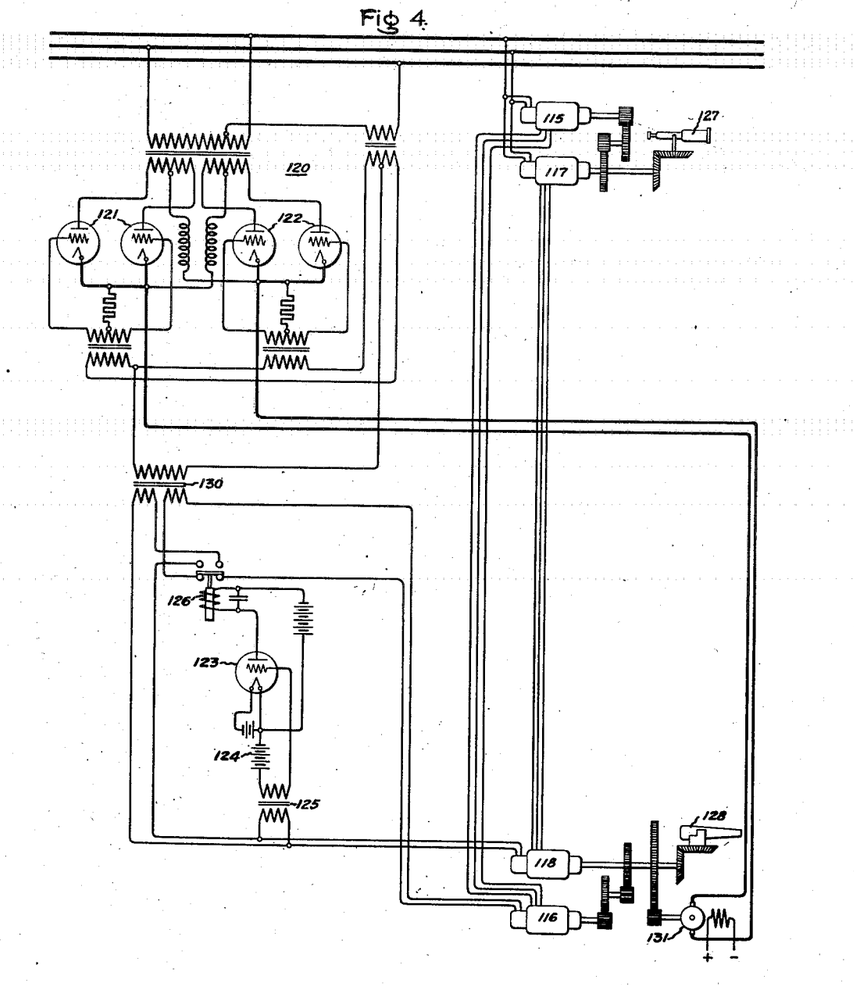

The modified form of Fig. 4 is similar in most respects to the modification of Fig. 3 but differs therefrom in the provisions of means for obtaining graduated control of the driving motor from both the fine and coarse control means. A further improvement resides in an improved circuit arrangement by means of which the grid control of the electric valve apparatus is transferred between the high and low speed rotary induction apparatus by means of a single electric valve and an electro-responsive device controlled thereby. The high speed rotary induction apparatus 115, 116 and the low speed rotary induction apparatus 117, 118 are identical with the apparatus 91, 92, 93, 94 of Fig. 3 and require no further description. Similarly the electric valve apparatus 120 of Fig. 4 is identical with the valve apparatus 95 of Fig. 3, and the anode, grid, and cathode supply connections for the pairs of valves 121 and 122 are in all respects identical with the corresponding connections of the pairs of valves 96, 97 of Fig. 3. The electric valve 123 may be of any suitable type, but is preferably of the three-electrode high vacuum type having its grid biased to cut off by suitable biasing means illustrated as a battery 124. The grid or input circuit of the valve 123 is connected to the rotor circuit of high speed rotary induction receiving device 118 by means of a grid control transformer 125. An electro-responsive device, illustrated as a relay 126 under the control of electric valve 123, serves to transfer the grid control connections of the electric valve apparatus 120 between the high and low speed rotary induction apparatus depending upon the amount of positional disagreement between the pilot device illustrated as a telescope 127 and the driven object, illustrated as a gun 128. With the telescope 127 and the gun 128 in correspondence, both pairs of electric valves 121, 122 and the valve 123 are deenergized. Similarly, the electromagnetic switching device 126 is deenergized and its movable contact member occupies the lower position in which it connects the rotor circuit of the high speed rotary induction receiving device 116 to the right-hand half of the primary winding of the grid transformer 130, the secondary winding of which is connected to the grid circuit of the electric valve apparatus 120. Rotation of the telescope 127 effects a corresponding rotation of the rotor of the high speed transmitting device 115 resulting in a voltage being induced in the rotor winding of the high speed receiving device 116. This voltage is applied to the grid circuit of the electric valve apparatus 120 so that the phase of the grid voltage of one of the pairs of valves is advanced and that of the other pair retarded. Assuming that the direction of rotation of the telescope such as to advance the phase of the grid voltage of the pair of valves 121, current is supplied to the gun driving motor 131 in a direction such that the gun 128 is driven in a direction corresponding to the direction of rotation of the telescope.

If the telescope 127 becomes more than the maximum permissible amount out of correspondence with the gun, the voltage induced in the rotor winding of the low speed rotary receiving device 118 becomes sufficiently great to overcome the negative grid bias of the electric valve 123. This causes the valve 123 to become conducting and to energize the operating winding of the relay 126, the movable contact of which is attracted to its upper position in response to the energization of its operating coil thereby interrupting the connection from the high speed rotary receiving device 116 to its primary of the grid transformer 130, thus rendering the high speed fine control apparatus ineffective. At the same time, the movable contact of the relay 126 bridges its cooperating upper stationary contacts to complete connections from the rotor winding of the low speed rotary induction receiving device 118 to the left-hand primary winding of the grid transformer 130. The polarity of the voltage thus applied to the grid circuit of the electric valve apparatus 120 is such that the pair of valves 121 is maintained energized and the effective value of this voltage is substantially dependent upon the degree of angular disagreement between the telescope 127 and the gun 128. Consequently, the valves 121 supply a current to the gun motor 131 which is proportional to this angular disagreement and the motor drives the gun at a proportional speed.

As the telescope is brought to rest trained on the target and the gun arrives within the maximum permissible positional disagreement of the high speed fine controlling system, the voltage induced in the rotor winding of the low speed receiving device 118 decreases sufficiently to render the negative grid bias of the valve 123 effective once more to render the valves nonconducting. As a result of this, the relay 126 is deenergized and its movable contact descends to the lower position in which it is illustrated thereby interrupting the connections from the low speed receiving device 118 to the grid transformer 130, thereby taking the control away from the low speed coarse system and simultaneously reestablishing the connection from the high speed receiving device 116 to the grid transformer 130. The control is thus retransferred to the high speed fine controlling system. Finally as the gun 128 approaches exact and accurate correspondence with the telescope, the voltage induced in the rotor of the high speed receiving device becomes greatly reduced and the phase of the grid voltage of the pair of valves 121 is correspondingly retarded, thereby decreasing the current supplied to the gun motor 131 substantially to zero so that the gun is finally brought to rest trained on the target in correspondence with the telescope. As in the case of the modification of Fig. 3, it will be clear that if the telescope 127 is rotated in the opposite direction, the pair of valves 122 will initially be energized under the control of the high speed fine system and the motor 131 caused to drive the gun in a direction corresponding to the direction of rotation of the telescope. Likewise, when the positional disagreement of the gun and telescope exceeds the maximum permissible amount, the valve 123 becomes energized and the switching device 126 is operated to its upper position to render the high speed fine controlling system ineffective and to transfer the control to the low speed coarse system to complete the connections from the low speed rotary receiving device to the grid transformer 130, thereby transferring the control from the high speed fine system to the low speed coarse system. Similarly when the gun arrives within the maximum permissible amount of angular disagreement of the high speed controlling system, the relay 126 is deenergized and the control is transferred to the high speed fine controlling system. It will be understood that before either the high speed fine controlling system or the low speed coarse controlling system is effective the voltage applied to the grid circuit of the electric valve apparatus 120 is proportional to the angular disagreement of the telescope and the gun and likewise the current supplied to the gun motor 131 is dependent upon the amount of angular disagreement. This improves the accuracy of the system generally since a graduated control over the gun motor is provided irrespective of whether the high speed or the low speed system is active.

It will be observed that in the modified systems of Figs. 2, 3 and 4 the mechanical switching apparatus 42–46 inclusive operated by the low speed receiver 37 of Fig. 1 is eliminated and that this mechanical switching apparatus is replaced in the modifications of Figs. 2 and 3 by electric valve apparatus connected to produce the same controlling effect. This elimination of mechanical switching apparatus by the receiver of the low speed control system eliminates inaccuracies due to lost motion and wear of the mechanical switching arrangement.

Although in accordance with the provisions of the patent statutes this invention is described as embodied in concrete form, it will be understood that the apparatus and connections shown and described are merely illustrative and that the invention is not limited thereto since alterations and modifications will readily suggest themselves to persons skilled in the art without departing from the true spirit and scope of this invention and the scope of the annexed claims.

What I claim as new and desire to secure by Letters Patent of the United States, is:—

1. In a system for driving an object into positional agreement with a control device, an electric motor for driving said driven object, means for controlling the supply to said motor comprising electric valve apparatus provided with a control grid, coarse and fine means controlled in response to positional disagreement of said control device and driven object for controlling said grid, said fine means serving to control said grid to vary the current supplied to said motor in proportion to said positional disagreement and means controlled by said positional disagreement for selectively actuating said fine and coarse control means.

2. In a system for driving an object into positional agreement with a control device, an electric motor for driving said driven object, means for controlling the supply of current to said motor comprising electric valve apparatus provided with a control grid, means responsive to positional disagreement of said control device and driven object for effecting a coarse control of the voltage of said grid, means responsive to said positional disagreement for effecting fine control of said grid voltage to vary the current supplied to said motor in proportion to said positional disagreement, and means controlled by the magnitude of said positional disagreement for selectively actuating said coarse and fine control means.

3. In a follow-up system for driving an object into positional agreement with a control device, an electric motor for driving said driven object, means for controlling the supply of current to said motor comprising electric valve apparatus provided with a control grid, means for controlling the supply of a substantially constant voltage to said grid for effecting coarse control, means for controlling the supply of voltage to said grid proportional to the positional disagreement of said control device and driven object for effecting fine control, and means responsive to positional disagreement of said control device and driven object for actuating said coarse control means when said disagreement exceeds a predetermined amount and for actuating said fine control means when said disagreement is less than said amount.

4. In a follow-up system for driving an object into positional agreement with a control device, an electric motor for driving said driven object, supply means for said motor comprising electric valve apparatus provided with a control grid, means controlled by positional disagreement of said control device and driven object for applying a voltage to said grid proportional to said disagreement for effecting fine control of the grid voltage, means for controlling the application of a voltage of substantially constant effective value to said grid for effecting coarse control, and means controlled by the amount of said disagreement for actuating said fine control means when said disagreement is less than a predetermined amount and for actuating said coarse control means when said disagreement exceeds said amount.

5. In a follow-up system for driving an object into positional agreement with a control device, an electric motor for driving the driven object, supply means for said motor comprising electric valve apparatus provided with a control grid, rotary induction apparatus operated at a relatively high speed for controlling the supply of voltage to said grid for effecting fine control, additional rotary induction apparatus operated at a relatively low speed for effecting coarse control, and means comprising a heart cam member actuated in response to positional disagreement of said control device and driven object and a switching device actuated by said cam for actuating said high speed means when said disagreement is less than a predetermined amount and for actuating said low speed means when said disagreement is greater than said amount.

6. In a follow-up system for driving an object into positional agreement with a control object, an electric motor for driving said driven object, supply means for said motor comprising electric valve apparatus provided with a control grid, means for effecting fine control of said system comprising rotary induction apparatus operated at relatively high speed for supplying a voltage to said grid proportional to the amount of positional disagreement of said objects, a transformer for supplying a voltage of substantially constant effective value to said grid, means providing coarse control comprising additional rotary induction apparatus operated by said objects at relatively low speed, a heart cam actuated by said low speed apparatus and switching means controlled by said cam for actuating said high speed apparatus when said disagreement is less than a predetermined amount and for connecting said transformer to said grid when said disagreement exceeds said amount, and connections controlled by said heart cam for reversing the polarity of said transformer in accordance with the direction of said disagreement.

7. A follow-up control system for driving an object into positional agreement with a control device comprising an electric motor for driving the driven object, supply means for said motor comprising electric valve apparatus provided with a control grid, fine control means for said motor comprising means for supplying a voltage to said grid proportional to the positional disagreement of said control device and driven object thereby to activate said valve apparatus and coarse control means for said motor comprising additional electric valve apparatus provided with a control grid, means biasing said grid to cut off, means responsive to a predetermined amount of positional disagreement of said control device and driven object for supplying a voltage to overcome said bias and activating said additional valve apparatus, and switching means controlled by said additional valve apparatus for controlling the grid of said first-mentioned valve apparatus and for rendering said fine control means inactive.

8. In a follow-up control system for driving an object into positional agreement with a control device, an electric motor for driving said object, supply means for said motor comprising electric valve apparatus provided with a control grid, means providing fine control of said motor comprising rotary induction apparatus operated at comparatively high speed by said control device and driven object for supplying a voltage to said grid proportional to the positional disagreement of said control device and driven object, and means providing coarse control of said motor comprising additional electric valve apparatus provided with a control grid, means biasing said grid to cut off, additional rotary induction apparatus operated by said control device and driven object at low speed for supplying a voltage to overcome said bias to activate said additional valve apparatus when the positional disagreement of said device and object exceeds a predetermined amount, and switching means actuated by said additional valve apparatus for applying a voltage to the grid of said first-mentioned valve apparatus and for interrupting the connection from said high speed induction apparatus to said last-mentioned grid.

9. In a system for driving an object into positional agreement with a pilot device, an electric motor for driving said driven object, means for selectively supplying current to said motor for rotation in either direction comprising a pair of electric valves, each provided with a control grid, fine control means responsive to positional disagreement of said driven object and pilot device for selectively energizing said grids with voltages of a polarity dependent upon the direction of said positional disagreement and of a magnitude varying with the magnitude of said disagreement, coarse control means for selectively applying a voltage of fixed magnitude to said grid, and means controlled by the magnitude of said disagreement for selectively energizing said coarse and fine control means.

10. In a follow-up system, a pilot device, a controlled object, an electric motor for driving said driven object into positional correspondence with said pilot device, means for controlling the supply of current to said motor comprising electric valve apparatus provided with a control grid, coarse and fine means controlled in response to positional disagreement of said control device and driven object for controlling said grid, said coarse and fine means each serving to control said grid to vary the current supplied to said motor in proportion to said positional disagreement, and means controlled by said positional disagreement for selectively actuating said coarse and fine control means.

11. In a follow-up remote control system, a pilot device, a controlled object, an electric motor for driving said object into positional agreement with said device, means for controlling the supply of current to said motor comprising electric valve apparatus provided with a control grid, coarse means for controlling said grid comprising relatively low speed rotary induction means for supplying a voltage to said grid proportional to the positional disagreement of said device and object, fine means for controlling said grid comprising relatively high speed rotary induction means for supplying a voltage to said grid proportional to said positional disagreement, and means controlled by said positional disagreement for transferring the control of said grid between said high and low speed means.

12. A follow-up control system comprising a control device, a controlled object, an electric motor for driving said object into positional agreement with said device, means for controlling the supply of current to said motor comprising electric valve apparatus provided with a control grid, coarse grid control means comprising slow speed rotary induction apparatus for supplying a voltage to said grid proportional to the positional disagreement of said device and object, fine grid control means comprising high speed rotary induction apparatus for supplying a voltage to said grid proportional to said positional disagreement, and means for transferring said grid control between said high speed and low speed apparatus comprising an electric valve provided with a control grid connected to said low speed apparatus and an electroresponsive device controlled by said valve for selectively connecting said high and low speed apparatus to the grid of said valve apparatus.

MARTIN A. EDWARDS.